(12) United States Patent
Okabe et al.

(10) Patent No.: US 9,047,562 B2
(45) Date of Patent: Jun. 2, 2015

(54) DATA PROCESSING DEVICE, INFORMATION STORAGE MEDIUM STORING COMPUTER PROGRAM THEREFOR AND DATA PROCESSING METHOD

(75) Inventors: Koji Okabe, Tokyo (JP); Ken Hanazawa, Tokyo (JP); Seiya Osada, Tokyo (JP); Takayuki Arakawa, Tokyo (JP); Daisuke Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 410 days.

(21) Appl. No.: 13/520,728

(22) PCT Filed: Dec. 2, 2010

(86) PCT No.: PCT/JP2010/007021
§ 371 (c)(1),
(2), (4) Date: Aug. 10, 2012

(87) PCT Pub. No.: WO2011/083528
PCT Pub. Date: Jul. 14, 2011

(65) Prior Publication Data
US 2012/0310866 A1    Dec. 6, 2012

(30) Foreign Application Priority Data
Jan. 6, 2010   (JP) ................................. 2010-000940

(51) Int. Cl.
*G06F 15/18*    (2006.01)
*G06N 5/02*    (2006.01)
(Continued)

(52) U.S. Cl.
CPC ......... *G06N 5/02* (2013.01); *G10L 15/08* (2013.01); *G10L 2015/085* (2013.01); *G10L 25/24* (2013.01)

(58) Field of Classification Search
None
See application file for complete search history.

(56) References Cited

U.S. PATENT DOCUMENTS 5,577,162 A * 11/1996 Yamazaki .................... 704/232
5,970,450 A * 10/1999 Hattori ......................... 704/239
(Continued)

FOREIGN PATENT DOCUMENTS

JP        02-300798 A    12/1990
JP        04-298796 A    10/1992
(Continued)

OTHER PUBLICATIONS

Fabian et al., "A Confidence-Guided Dynamic Pruning Approach—Utilization of Confidence Measurement in Speech Recognition," Interspeech 2005, Lisboa, ISCA.*

*Primary Examiner* — Kakali Chaki
*Assistant Examiner* — Fuming Wu
(74) *Attorney, Agent, or Firm* — Sughrue Mion, PLLC (57) ABSTRACT

A plurality of pruning measures (PM) are calculated from a feature amount (CV) of test data (TD) which is input, a plurality of isopycnic surfaces (EC) are plotted and set on a threshold space (SS), a threshold curved surface (SC) in which a decrease in at least one of a plurality of pruning measures (PM) causes an increase in at least one thereof is generated using a portion of one isopycnic surface (EC) as a part, a hypothesis curved surface (HC) of subject data (CD) is generated on the threshold space (SS) to set a position intersecting the threshold curved surface (SC) to a pruning threshold (PS), and a plurality of hypotheses of the subject data (CD) are pruned. Thereby, there is provided a data processing device of which at least one of the recognition speed and the recognition accuracy is higher than in the related art.

7 Claims, 8 Drawing Sheets (51) Int. Cl.
   *G10L 15/08*   (2006.01)
   *G10L 25/24*   (2013.01)

(56) References Cited

U.S. PATENT DOCUMENTS

| | | | |
|---|---|---|---|
| 6,285,786 B1* | 9/2001 | Seni et al. | 382/187 |
| 6,304,834 B1* | 10/2001 | Enda | 703/4 |
| 6,314,399 B1* | 11/2001 | Deligne et al. | 704/257 |
| 7,493,258 B2* | 2/2009 | Kibkalo et al. | 704/242 |
| 7,698,235 B2* | 4/2010 | Kuroiwa | 706/12 |
| 2003/0085831 A1* | 5/2003 | Lavoie | 342/13 |
| 2004/0220809 A1* | 11/2004 | Wang et al. | 704/257 |
| 2005/0071301 A1* | 3/2005 | Kuroiwa | 706/12 |
| 2005/0143995 A1* | 6/2005 | Kibkalo et al. | 704/242 |
| 2010/0063948 A1* | 3/2010 | Virkar et al. | 706/12 |
| 2011/0131042 A1* | 6/2011 | Nagatomo | 704/240 |
| 2011/0212751 A1* | 9/2011 | Havens et al. | 455/556.1 |
| 2012/0130586 A1* | 5/2012 | Ehrman et al. | 701/32.2 |
| 2012/0310866 A1* | 12/2012 | Okabe et al. | 706/12 |
| 2013/0268271 A1* | 10/2013 | Osada et al. | 704/240 |
| 2013/0282374 A1* | 10/2013 | Okabe et al. | 704/236 |

FOREIGN PATENT DOCUMENTS

| | | |
|---|---|---|
| JP | 05-035292 A | 2/1993 |
| JP | 06-282295 A | 10/1994 |
| JP | 10-153999 A | 6/1998 |
| JP | 10-254496 A | 9/1998 |
| JP | 2001-075596 A | 3/2001 |

* cited by examiner

DATA PROCESSING DEVICE, INFORMATION STORAGE MEDIUM STORING COMPUTER PROGRAM THEREFOR AND DATA PROCESSING METHOD

CROSS REFERENCE TO RELATED APPLICATION

This application is a National Stage of International Application No. PCT/JP2010/007021, filed on Dec. 2, 2010, which claims priority from Japanese Patent Application No. 2010-000940, filed Jan. 6, 2010, the contents of all of which are incorporated herein by reference in their entirety.

TECHNICAL FIELD

The present invention relates to a data processing device for searching subject data to be input for a hypothesis, and particularly relates to a data processing device, a computer program therefor and a data processing method for pruning a hypothesis which exceeds a pruning threshold in the course of a search.

BACKGROUND ART

With respect to a hypothesis search, a hypothesis having a pruning measure which exceeds a pruning threshold in the course of search is pruned, and a beam search for reducing the calculation amount is often performed for the purpose of efficiency of the search. As pruning measures of the beam search, two measures of the score difference from a maximum likelihood hypothesis and the number of hypotheses are generally widely used.

A score difference threshold is used to prune a hypothesis having a greater score difference from a maximum likelihood hypothesis than the threshold, and a hypothesis number threshold is used to prune a hypothesis having a larger hypothesis rank than the threshold.

These thresholds may be set to statically fixed values, and may be dynamically changed for each audio frame using certain criteria. For example, a technique is proposed in which acoustic reliability in each audio frame is calculated, and the score difference threshold is dynamically adjusted according thereto.

Figure 7:
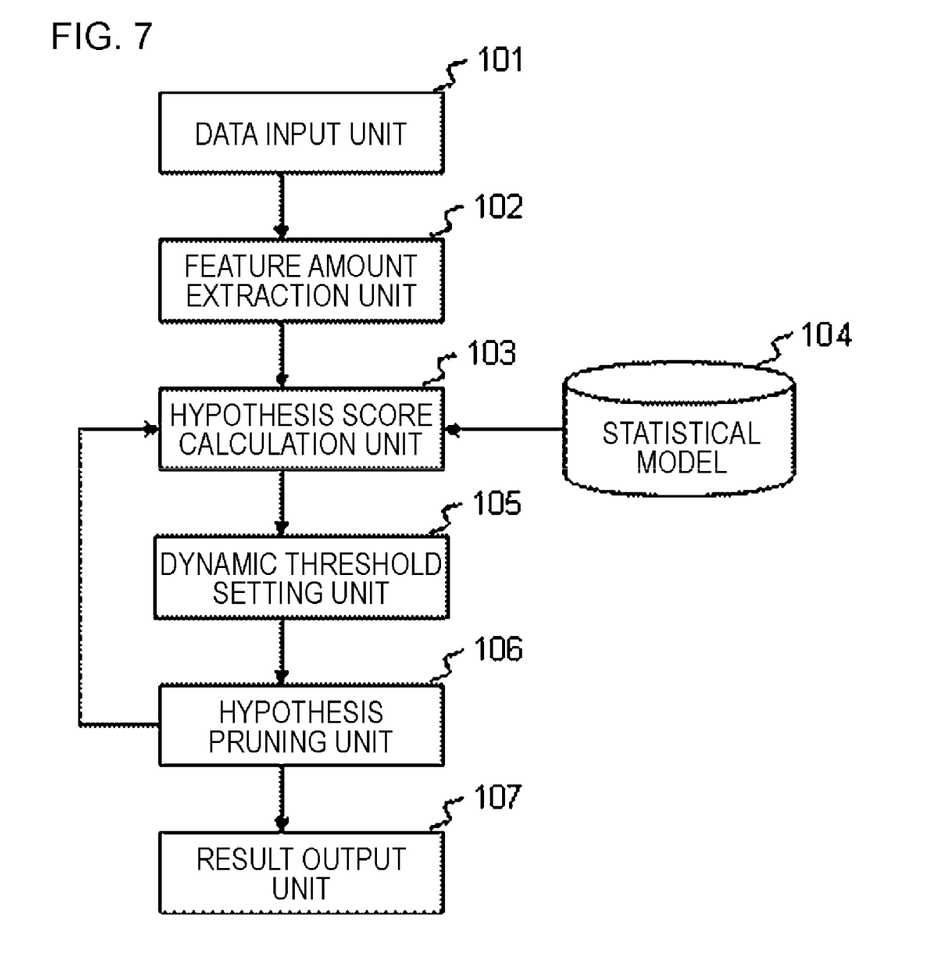
FIG. 7 is a schematic block diagram illustrating a logical structure of a data processing system according to a related art example.

As shown in FIG. 7, a data processing device in the related art mentioned above includes a data input unit 101, a feature amount extraction unit 102, a hypothesis score calculation unit 103, a statistical model 104, a dynamic threshold setting unit 105, a hypothesis pruning unit 106, and a result output unit 107.

The data processing device in the related art having such a configuration operates as follows. That is, the data input unit 101 inputs data on which a search is performed, the feature amount extraction unit 102 extracts the feature amount from subject data, the hypothesis score calculation unit 103 calculates a score of the feature amount using the statistical model 104, the dynamic threshold setting unit 105 sets a threshold in each measure used for pruning, the hypothesis pruning unit 106 prunes hypotheses on the basis of the pruning threshold, and the result output unit 107 finally outputs a hypothesis having the highest score as a result (Non-Patent Document 1).

RELATED DOCUMENT

Patent Document

Figure 8:
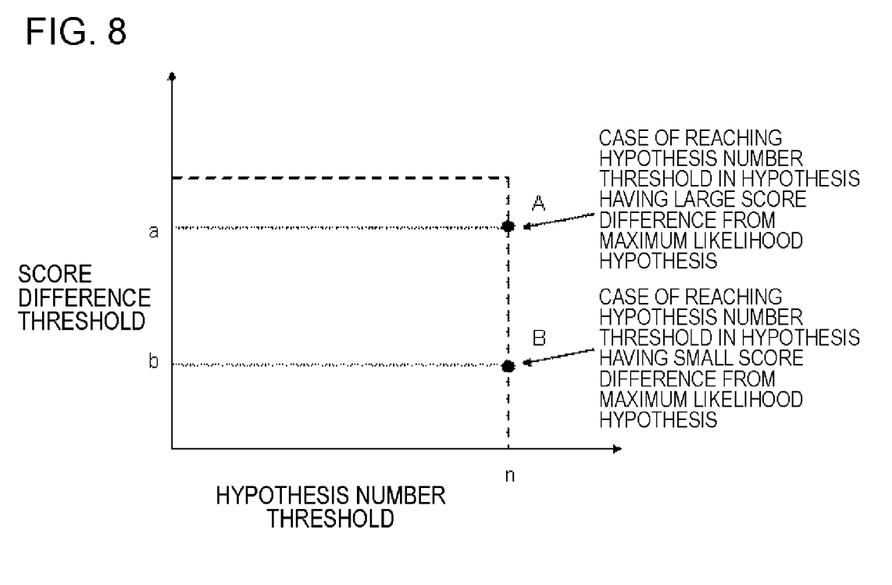
FIG. 8 is a schematic characteristic diagram illustrating a threshold plane surface according to a related art example.

[Non-Patent Document 1] "A Confidence-Guided Dynamic Pruning Approach—Utilization of Confidence Measurement in Speech Recognition—" Tibor Fabian et al. INTERSPEECH 2005, ISCA However, for example, in the data processing device in the related art in which a search is performed using the hypothesis number threshold, when attention is focused on the case where the number of hypotheses before pruning exceeds the hypothesis number threshold, the same number (n) of hypotheses are caused to remain, as shown in FIG. 8, even in the case (A) of reaching the hypothesis number threshold in a hypothesis having a large score difference from the maximum likelihood hypothesis, and the case (B) of reaching the hypothesis number threshold in a hypothesis having a small score difference from the maximum likelihood hypothesis.

However, prunings using the score difference thresholds of a in the former and b in the latter are the same as each other. When the pruning is performed using b which is the small score difference threshold, it is more likely to erroneously prune a correct hypothesis, and thus cause a search error.

When a plurality of pruning measures are used, and one pruning threshold is exceeded as mentioned above, there is a problem that pruning is performed using only a measure exceeding the threshold and thus a search error is caused in a case of a value which does not reach the threshold with respect to all other pruning measures, and a value close to the threshold.

DISCLOSURE OF THE INVENTION

The invention is contrived in view of such circumstances, and an object thereof is to provide a data processing device, a computer program thereof and a data processing method of which at least one of the recognition speed and the recognition accuracy is higher than in the related art.

According to the invention, there is provided a data processing device including: a data input unit that inputs test data in which a correct hypothesis is established in a learning mode for each of predetermined inputs, and inputs subject data for a hypothesis search in a search mode for each of the inputs; a feature amount extraction unit that analyzes the input test data and the input subject data and extracts each feature amount; a hypothesis measure calculation unit that calculates a plurality of pruning measures for each of a plurality of hypotheses of the test data and the subject data using the extracted feature amount; data plotting unit that plots the plurality of hypotheses of the input test data on a threshold space specified by the plurality of pruning measures, corresponding to each of the calculated pruning measures; an isopycnic surface setting unit that sets a plurality of isopycnic surfaces on the threshold space, corresponding to densities of the plurality of plotted hypotheses; a threshold curved surface generation unit that generates, on the threshold space, a threshold curved surface made of the plurality of pruning thresholds in which a decrease in at least one of the plurality of pruning measures causes an increase in at least one thereof, using a portion of one surface selected from the plurality of isopycnic surfaces as a part; a hypothesis curved surface generation unit that generates a hypothesis curved surface made of the plurality of hypotheses of the subject data on the threshold space, corresponding to each of the calculated pruning measures; and a hypothesis pruning unit that prunes the plurality of hypotheses of the subject data, using a position at which the generated hypothesis curved surface intersects the threshold curved surface as the pruning threshold.

According to the invention, there is provided a computer program of the above-mentioned data processing device, the program causing the data processing device to execute: a data input process of inputting test data in which a correct hypothesis is established in a learning mode for each of predetermined inputs, and inputting subject data for a hypothesis search in a search mode for each of the inputs; a feature amount extraction process of analyzing the input test data and the subject data and extracting each feature amount; a hypothesis measure calculation process of calculating a plurality of pruning measures for each of a plurality of hypotheses of the test data and the subject data using the extracted feature amount; a data plotting process of plotting the plurality of hypotheses of the input test data on a threshold space specified by the plurality of pruning measures, corresponding to each of the calculated pruning measures; an isopycnic surface setting process of setting a plurality of isopycnic surfaces on the threshold space, corresponding to densities of the plurality of plotted hypotheses; a threshold curved surface generation process of generating, on the threshold space, a threshold curved surface made of the plurality of pruning thresholds in which a decrease in at least one of the plurality of pruning measures causes an increase in at least one thereof, using a portion of one surface selected from the plurality of isopycnic surfaces as a part; a hypothesis curved surface generation process of generating a hypothesis curved surface made of the plurality of hypotheses of the subject data on the threshold space, corresponding to each of the calculated pruning measures; and a hypothesis pruning process of pruning the plurality of hypotheses of the subject data, using a position at which the generated hypothesis curved surface intersects the threshold curved surface as the pruning threshold.

According to the invention, there is provided a data processing method of the above-mentioned data processing device, including: a data input operation of inputting test data in which a correct hypothesis is established in a learning mode for each of predetermined inputs, and inputting subject data for a hypothesis search in a search mode for each of the inputs; a feature amount extraction operation of analyzing the input test data and the subject data and extracting each feature amount; a hypothesis measure calculation operation of calculating a plurality of pruning measures for each of a plurality of hypotheses of the test data and the subject data using the extracted feature amount; a data plotting operation of plotting the plurality of hypotheses of the input test data on a threshold space specified by the plurality of pruning measures, corresponding to each of the calculated pruning measures; an isopycnic surface setting operation of setting a plurality of isopycnic surfaces on the threshold space, corresponding to densities of the plurality of plotted hypotheses; a threshold curved surface generation operation of generating, on the threshold space, a threshold curved surface made of the plurality of pruning thresholds in which a decrease in at least one of the plurality of pruning measures causes an increase in at least one thereof, using a portion of one surface selected from the plurality of isopycnic surfaces as a part; a hypothesis curved surface generation operation of generating a hypothesis curved surface made of the plurality of hypotheses of the subject data on the threshold space, corresponding to each of the calculated pruning measures; and a hypothesis pruning operation of pruning the plurality of hypotheses of the subject data, using a position at which the generated hypothesis curved surface intersects the threshold curved surface as the pruning threshold.

Meanwhile, various types of components of the invention may be formed so as to realize functions thereof, and, for example, can be realized by dedicated hardware which fulfills a predetermined function, a data processing device to which a predetermined function is given through a computer program, a predetermined function realized by the data processing device through the computer program, any combination thereof, and the like.

In addition, various types of components of the invention does not necessarily exist separately independently, but a plurality of components may be formed as one member, one component may be formed as a plurality of members, any component may be formed as a portion of another component, and a portion of any component and a portion of another component may overlap each other.

In addition, in the computer program and the data processing method of the invention, a plurality of processes and operations are described in order, but the described order does not limit the order of executing a plurality of processes and a plurality of operations.

For this reason, when the computer program and the data processing method of the invention are performed, the order of a plurality of processes and a plurality of operations mentioned above can be changed without damaging the details.

Further, the computer program and the data processing method of the invention are not limited to execution of a plurality of processes and a plurality of operations with individually different timing. For this reason, another process and operation may occur during execution of any process and operation, and some or all of the execution timing of any process and operation and the execution timing of another process and operation may overlap each other.

In addition, the data processing device of the invention can be performed by hardware constructed general-purpose devices such as a central processing unit (CPU), a read only memory (ROM), a random access memory (RAM), and an interface (I/F) unit, a dedicated logic circuit constructed to execute a predetermined processing operation, a combination thereof, and the like, in order to be capable of executing corresponding processing operations by reading out the computer program.

Meanwhile, in the invention, causing the data processing device to execute various types of operations corresponding to the computer program also means causing the data processing device to control operations of various types of devices.

For example, storage of various types of data in the data processing device allows the CPU to store various types of data in an information recording medium such as a hard disc drive (HDD) fixed to the data processing device, and allows the CPU to store various types of data in an information recording medium such as a compact disc-recordable (CD-R) exchangeably loaded into the data processing device using a CD drive.

In the data processing device of the invention, the data input unit inputs the test data in which a correct hypothesis is established in a learning mode for each of predetermined input units, and inputs the subject data for a hypothesis search for each of the inputs in a search mode. The input test data and the input subject data are analyzed and the feature amount extraction unit extracts each feature amount. The hypothesis measure calculation unit calculates a plurality of pruning measures for each of a plurality of hypotheses of the test data and the subject data using the extracted feature amount. The data plotting unit plots a plurality of hypotheses of the input test data on the threshold space specified by a plurality of pruning measures, corresponding to each of the calculated pruning measures. The isopycnic surface setting unit sets a plurality of isopycnic surfaces on the threshold space, corresponding to the densities of a plurality of plotted hypotheses. The threshold curved surface generation unit generates, on the threshold space, the threshold curved surface made of a plurality of pruning thresholds in which a decrease in at least one of a plurality of pruning measures cause an increase in at least one thereof, using a portion of one surface selected from a plurality of isopycnic surfaces as a part. The hypothesis curved surface generation unit generates the hypothesis curved surface made of a plurality of hypotheses of the subject data on the threshold space, corresponding to each of the calculated pruning measures. The hypothesis pruning unit prunes a plurality of hypotheses of the subject data, using the position at which the generated hypothesis curved surface intersects the threshold curved surface as the pruning threshold. For this reason, when one hypothesis is searched for from the subject data in a search mode, a plurality of pruning measures of the pruning threshold appropriately change. Therefore, it is possible to provide the data processing device of which at least one of the recognition speed and the recognition accuracy is higher than in the related art.

BRIEF DESCRIPTION OF THE DRAWINGS

The above-mentioned objects, other objects, characteristics and advantages will be further obvious from the following preferred embodiment and the accompanying drawings.

DESCRIPTION OF EMBODIMENTS

Figure 1:
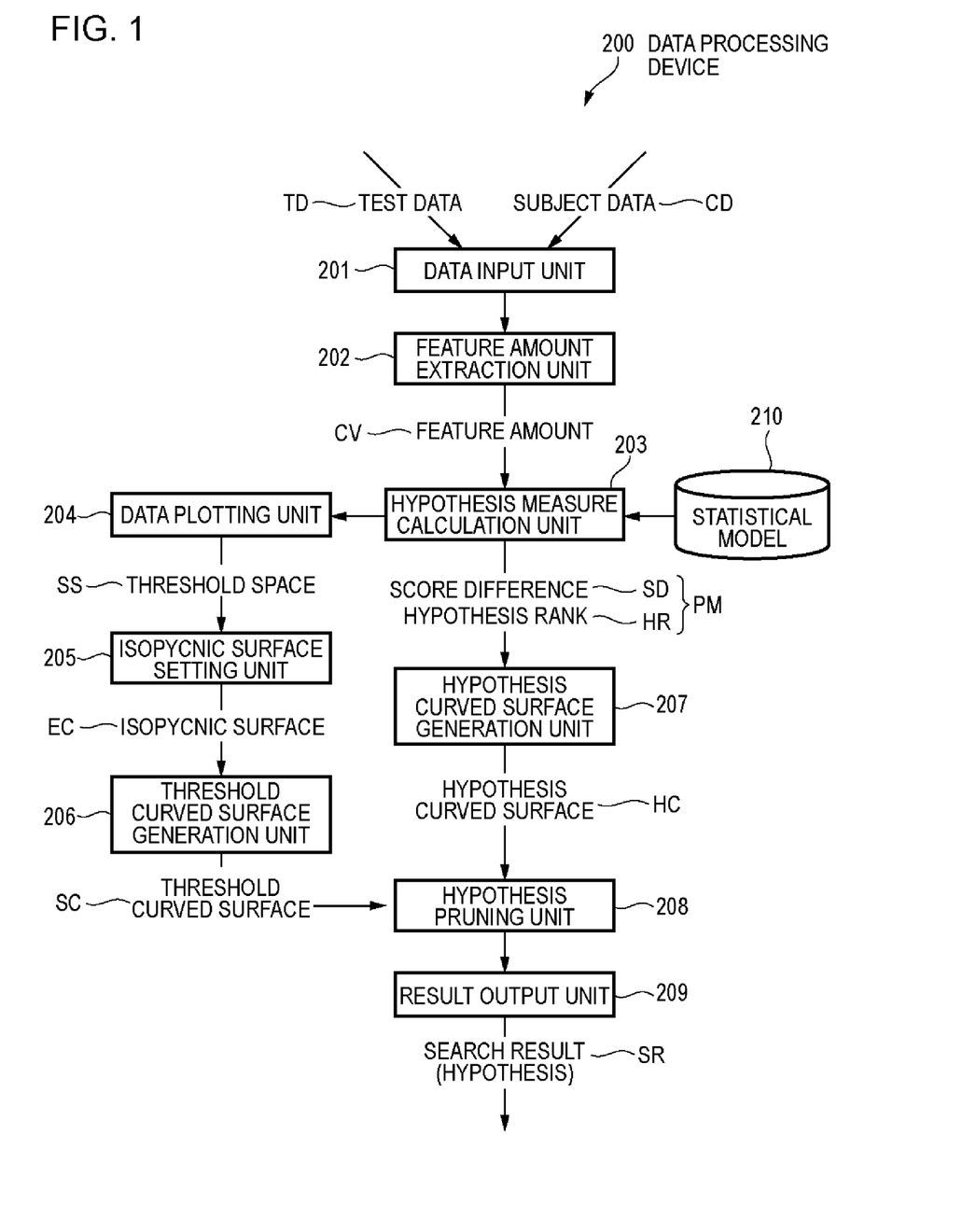
FIG. 1 is a schematic block diagram illustrating a logical structure of a data processing system according to an embodiment of the invention.

An embodiment of the invention will be described below with reference to FIGS. 1 to 6. As shown in FIG. 1, a data processing device 200 according to the embodiment includes a data input unit 201 that inputs test data TD in which a correct hypothesis is established in a learning mode for each of predetermined inputs, and inputs subject data CD for a hypothesis search in a search mode for each of the inputs, a feature amount extraction unit 202 that analyzes the input test data TD and the input subject data CD and extracts each feature amount CV, a hypothesis measure calculation unit 203 that calculates a plurality of pruning measures PM for each of a plurality of hypotheses of the test data TD and the subject data CD using the extracted feature amount CV, a data plotting unit 204 that plots a plurality of hypotheses of the input test data TD on a threshold space SS specified by a plurality of pruning measures PM, corresponding to each of the calculated pruning measures PM, an isopycnic surface setting unit 205 that sets a plurality of isopycnic surfaces EC on the threshold space SS, corresponding to the densities of a plurality of plotted hypotheses, a threshold curved surface generation unit 206 that generates, on the threshold space SS, a threshold curved surface SC made of a plurality of pruning thresholds PS in which a decrease in at least one of a plurality of pruning measures PM causes an increase in at least one thereof, using a portion of one surface selected from a plurality of isopycnic surfaces EC as a part, a hypothesis curved surface generation unit 207 that generates a hypothesis curved surface HC made of a plurality of hypotheses of the subject data CD on the threshold space SS, corresponding to each of the calculated pruning measures PM, and a hypothesis pruning unit 208 that prunes a plurality of hypotheses of the subject data CD, using a position at which the generated hypothesis curved surface HC intersects the threshold curved surface SC as the pruning threshold PS.

Further, the data processing device 200 according to the embodiment also includes a statistical model 210 for calculating a score of the subject data, and a result output unit 209 that outputs one hypothesis, having a maximum value of the scores accumulated from a plurality of hypotheses pruned in the search mode, as a search result SR.

More specifically, the threshold space SS is made of a two-dimensional threshold plane surface SS specified by a score difference SD of the hypotheses from a maximum likelihood hypothesis and a hypothesis rank HR which are two pruning measures PM. The hypothesis measure calculation unit 203 calculates the score for each of a plurality of hypotheses of the test data TD and the subject data CD using the extracted feature amount CV and calculates the score difference SD and the hypothesis rank HR as the pruning measures PM.

The isopycnic surface setting unit 205 sets isopycnic lines EC which are a plurality of isopycnic surfaces EC on the threshold plane surface SS, corresponding to the densities of a plurality of plotted hypotheses. The threshold curved surface generation unit 206 generates a threshold curve SC as the threshold curved surface SC on the threshold plane surface SS, the threshold curve being made of a plurality of pruning thresholds PS in which a decrease in one of the score difference SD and the hypothesis rank HR causes an increase in the other thereof, using a portion of one line selected from a plurality of isopycnic lines EC as a part.

The hypothesis curved surface generation unit 207 generates a hypothesis curve made of a plurality of hypotheses of the subject data CD as the hypothesis curved surface HC on the threshold plane surface SS, corresponding to the score difference SD and the hypothesis rank HR which are calculated.

The data processing device 200 according to the embodiment can be realized as, for example, computer equipment on which a computer program is installed. The computer program causes the data processing device 200 to execute, for example, a data input process of inputting test data TD in which a correct hypothesis is established in a learning mode for each of predetermined inputs, and inputting subject data CD for a hypothesis search in a search mode for each of the inputs, a feature amount extraction process of analyzing the input test data TD and the input subject data CD and extracting each feature amount CV, a hypothesis measure calculation process of calculating a plurality of pruning measures PM for each of a plurality of hypotheses of the test data TD and the subject data CD using the extracted feature amount CV, a data plotting process of plotting a plurality of hypotheses of the input test data TD on a threshold plane surface SS specified by a plurality of pruning measures PM, corresponding to each of the calculated pruning measures PM, an isopycnic surface setting process of setting a plurality of isopycnic lines EC on the threshold plane surface SS, corresponding to the densities of a plurality of plotted hypotheses, a threshold curved surface generation process of generating, on the threshold plane surface SS, a threshold curve SC made of a plurality of pruning thresholds PS in which a decrease in at least one of a plurality of pruning measures PM causes an increase in at least one thereof, using a portion of one line selected from a plurality of isopycnic lines EC as a part, a hypothesis curved surface generation process of generating a hypothesis curved surface HC made of a plurality of hypotheses of the subject data CD on the threshold plane surface SS, corresponding to each of the calculated pruning measures PM, a hypothesis pruning process of pruning a plurality of hypotheses of the subject data CD, using a position at which the generated hypothesis curved surface HC intersects the threshold curve SC as the pruning threshold PS, and a result output process of outputting one hypothesis having a maximum value of scores accumulated from a plurality of hypotheses pruned in the search mode as a search result SR.

In such a configuration, the data processing method of the data processing device according to the embodiment will be described below. First, as shown in FIGS. 2 and 3, the data processing device 200 according to the embodiment is set as, for example, an operation mode in which the learning mode and the search mode are switched to each other.

Figure 2:
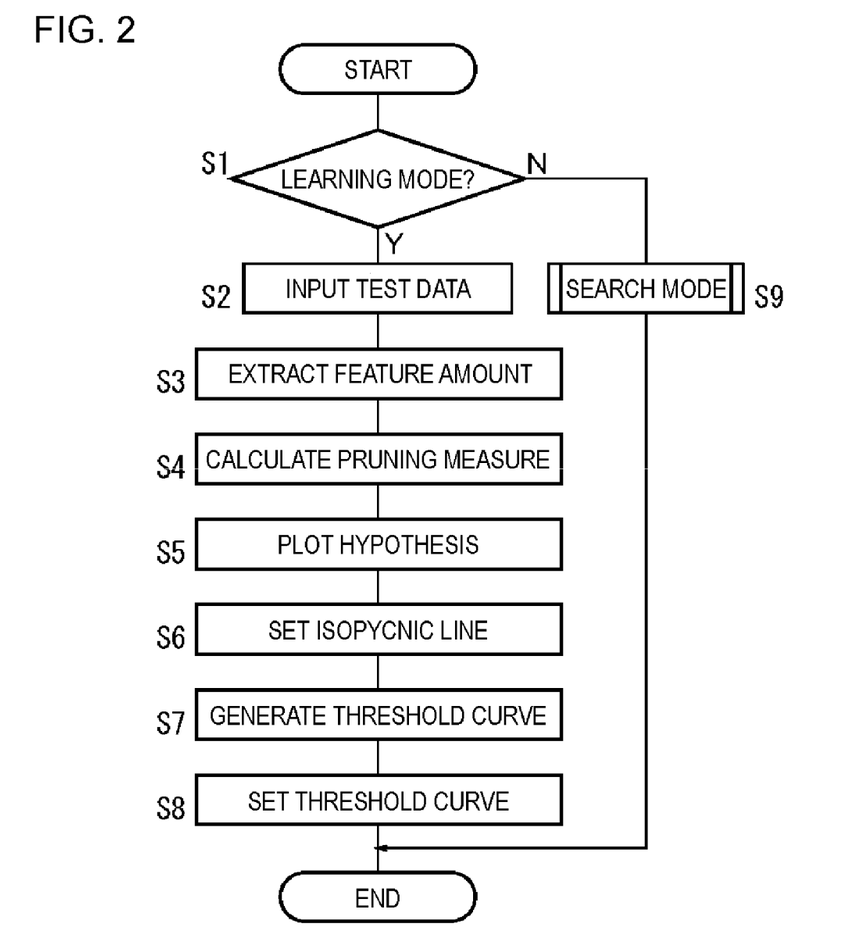
FIG. 2 is a flow diagram illustrating a data processing method of a learning mode of a data processing device.
Figure 3:
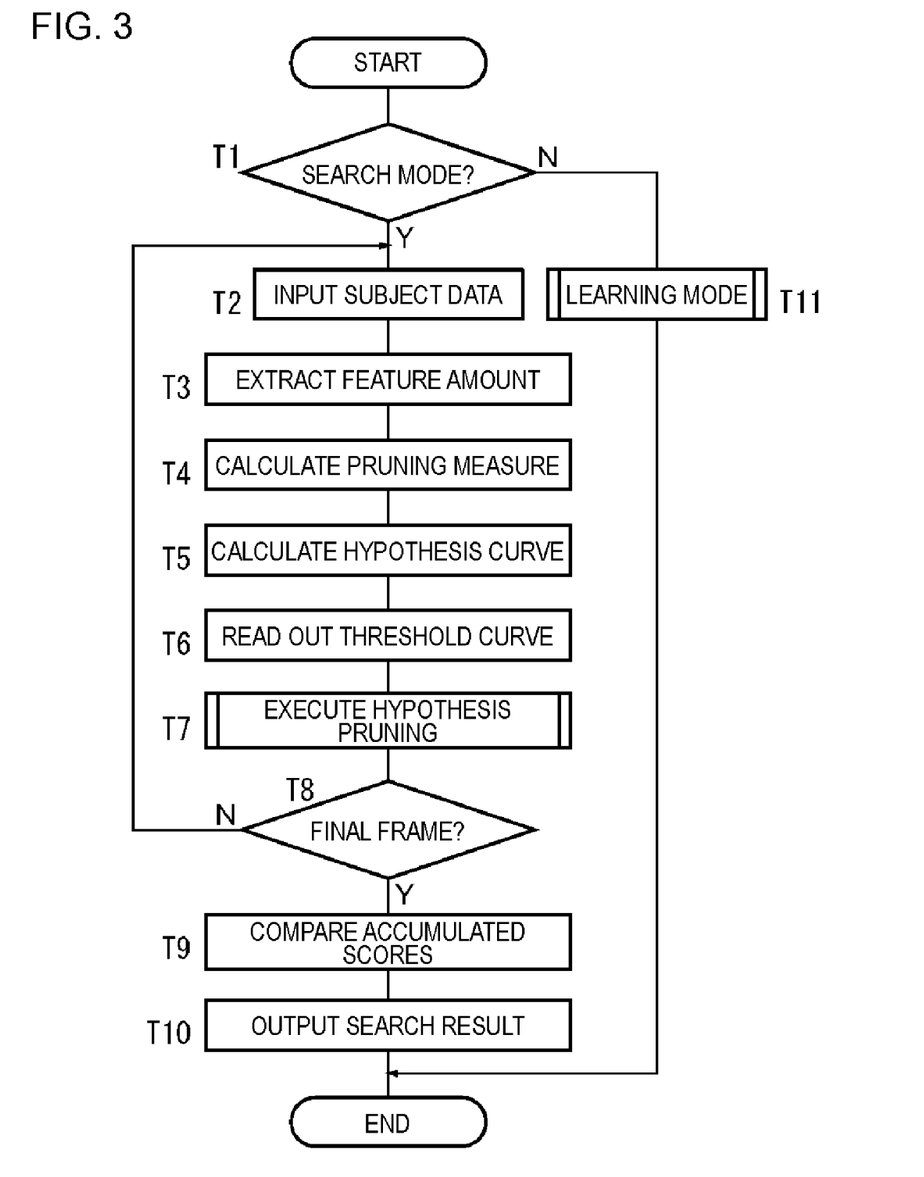
FIG. 3 is a flow diagram illustrating a data processing method of a search mode of the data processing device.

As shown in FIG. 2, in the learning mode, the threshold curve SC which is the threshold curve SC is generated from the input test data TD and is set in the data processing device 200. In the search mode, one hypothesis is output as a search result from the input subject data CD, using the set threshold curve SC.

Meanwhile, the following illustrates a case where the data processing device 200 executes the test data TD and the subject data CD as audio data, and executes a hypothesis search as audio recognition. First, as shown in FIG. 2, in the learning mode (step S1-Y), the test data TD in which a correct hypothesis is established is input for each audio frame which is a predetermined input (step S2). At this time, a sufficient amount of test data TD is input under a sufficiently widened beam width.

The input test data TD is analyzed and the feature amount CV is extracted (step S3). This extraction is executed, for example, by detecting a Mel frequency cepstrum coefficient (MFCC) from the spectrum of input audio of the test data TD which is input for each audio frame.

Next, a plurality of pruning measures PM are calculated for each of a plurality of hypotheses of the test data TD using the extracted feature amount CV (step S4). More specifically, the score which is a likelihood is obtained from the extracted feature amount CV of the test data TD and the statistical model 210 and is added to accumulated scores, and thus the score of each hypothesis is calculated.

Such score calculation is executed, for example, by addition of the acoustic score and the language score in the audio recognition. In the embodiment, as the pruning measure PM of the audio recognition, the score difference SD of the hypotheses from the maximum likelihood hypothesis and the hypothesis rank HR are calculated as mentioned above.

Figure 4:
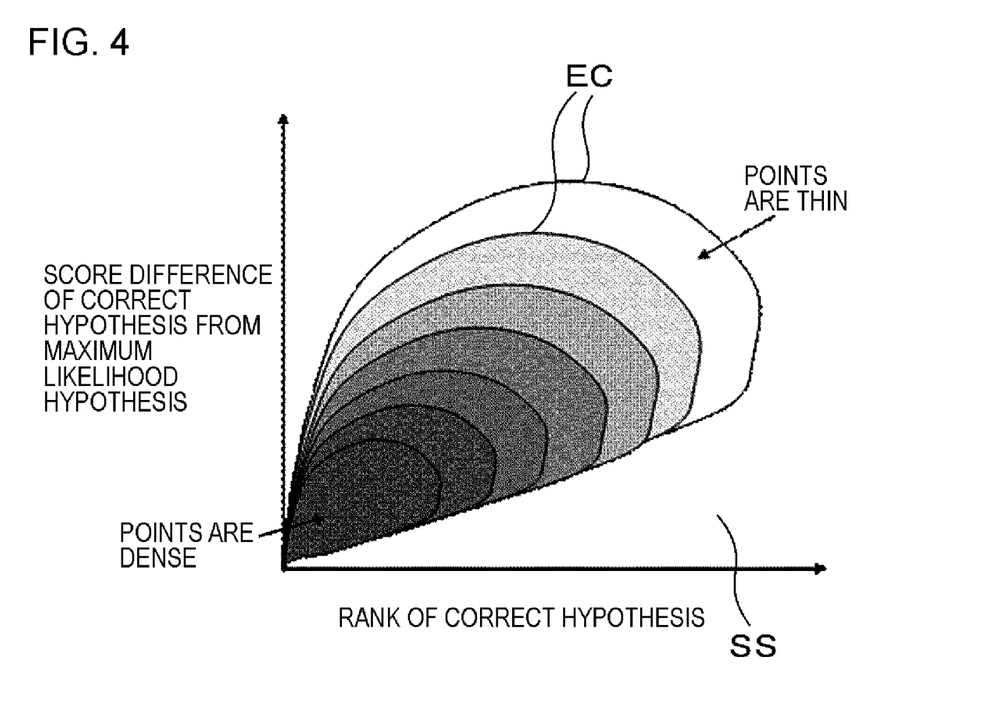
FIG. 4 is a schematic characteristic diagram illustrating a state where a hypothesis of test data is plotted on a threshold plane surface which is a threshold space and isopycnic lines which are isopycnic surfaces are generated.

Next, a plurality of hypotheses of the input test data TD are plotted on the threshold plane surface SS which is the two-dimensional threshold space SS specified by these pruning measures PM, as shown in FIG. 4, corresponding to the score difference SD from the maximum likelihood hypothesis calculated as mentioned above and the hypothesis rank HR (step S5).

Next, a plurality of isopycnic lines EC which are particular solutions of the isopycnic surfaces EC are set on the threshold plane surface SS, as shown in the drawing, corresponding to the densities of a plurality of hypotheses plotted as mentioned above (step S6).

Figure 5:
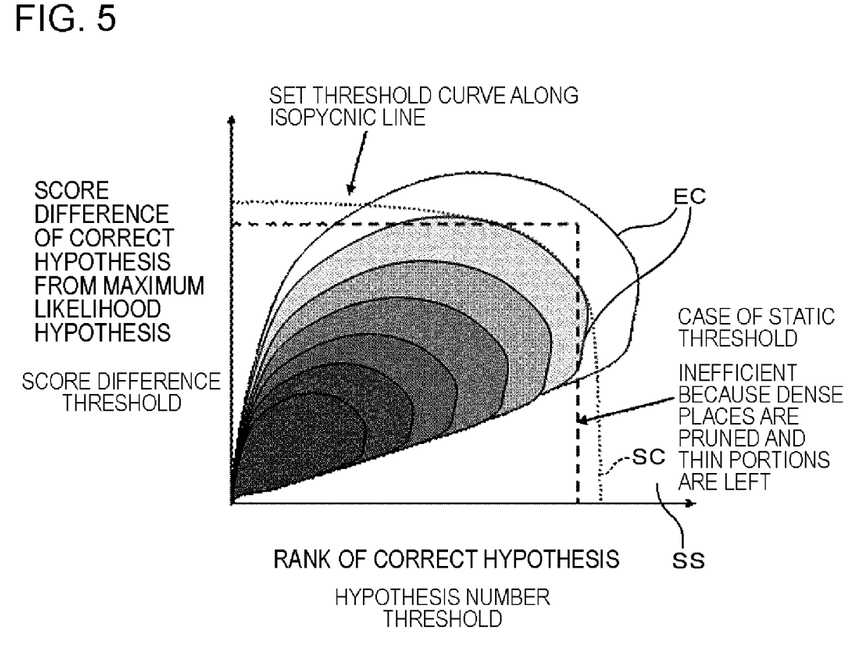
FIG. 5 is a schematic characteristic diagram illustrating a state where a threshold curve which is a threshold curved surface is generated on the threshold plane surface, corresponding to one isopycnic line.

Herein, one line is selected from a plurality of isopycnic lines EC, as shown in FIG. 5, corresponding to performance, specification, required recognition accuracy or the like of the data processing device 200. The threshold curve SC, which is a particular solution of the threshold curved surface SC, made of a plurality of pruning thresholds PS in which a decrease in one of the two pruning measures PM causes an increase in the other thereof is generated on the threshold plane surface SS, using a portion of one selected isopycnic line EC as a part (step S7).

The generation of the threshold curve SC is executed by, for example, connecting a specific curve such as a parabola to a portion of the isopycnic line EC so that a decrease in one of the two pruning measures PM causes an increase in the other thereof, using a portion of the isopycnic line EC as a part as mentioned above.

The threshold curve SC generated in this manner is set in the hypothesis pruning unit 208 (step S8), and thus the learning mode of the data processing device 200 is completed. In this manner, the data processing device 200 in which learning is completed can execute the audio recognition using the prepared threshold curve SC.

In that case, as shown in FIG. 3, the data processing device 200 is in a search mode (step T1-Y), and the subject audio which is the subject data CD for a hypothesis search is input for each audio frame which is an input (step T2).

Next, as in the case in the learning mode, the input test data TD is analyzed and each feature amount CV is extracted (step T3). Next, the score difference SD from the maximum likelihood hypothesis and the hypothesis rank HR are calculated as a plurality of pruning measures PM for each of a plurality of hypotheses of the subject data CD using the extracted feature amount CV (step T4).

Figure 6:
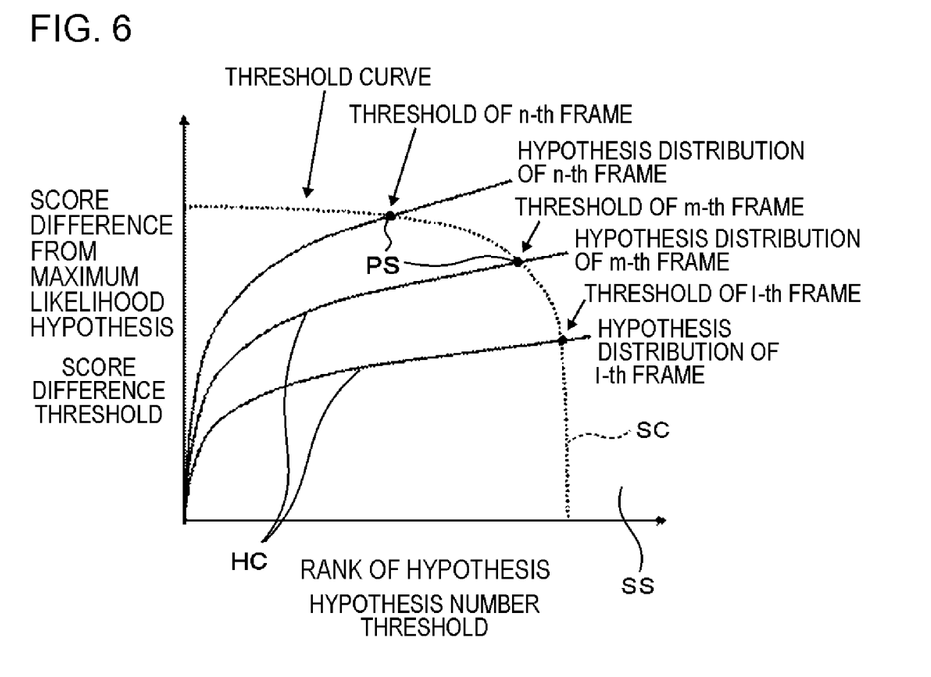
FIG. 6 is a schematic characteristic diagram illustrating a state where a hypothesis curve which is a hypothesis curved surface is generated on the threshold plane surface for each audio frame which is an input.

Next, the hypothesis curve HC which is a particular solution of the hypothesis curved surface HC made of a plurality of hypotheses of the subject data CD is generated on the threshold plane surface SS, as shown in FIG. 6, corresponding to each of the calculated pruning measures PM (step T6).

As shown in the drawing, the hypothesis curve HC of the subject data CD for each audio frame then intersects the threshold curve SC. Consequently, a plurality of hypotheses of the subject data CD are pruned using the position at which the hypothesis curved surface HC intersects the threshold curve SC as the pruning threshold PS in this manner (step T7).

Whether the audio frame is a final audio frame of the subject data CD is determined for each audio frame (step T8). When the audio frame is not a final audio frame (step T8-N), the next audio frame is received from the subject data (step T2).

When the audio frame is a final audio frame (step T8-Y), the accumulated scores of a plurality of hypotheses pruned as mentioned above are compared (step T9), and a hypothesis having a maximum value of the accumulated scores is output as the search result SR (step T10). A hypothesis having a maximum score is output as a result.

In the data processing device 200 according to the embodiment, as mentioned above, the data input unit 201 inputs the test data TD in which a correct hypothesis is established in a learning mode for each of predetermined inputs, and inputs the subject data CD for a hypothesis search for each of the inputs in a search mode.

The input test data TD and the input subject data CD are analyzed and the feature amount extraction unit 202 extracts each feature amount CV. The hypothesis measure calculation unit 203 calculates a plurality of pruning measures PM for each of a plurality of hypotheses of the test data TD and the subject data CD using the extracted feature amount CV.

The data plotting unit 204 plots a plurality of hypotheses of the input test data TD on the threshold plane surface SS specified by a plurality of pruning measures PM, corresponding to each of the calculated pruning measures PM.

The isopycnic surface setting unit 205 sets a plurality of isopycnic lines EC on the threshold plane surface SS, corresponding to the densities of a plurality of plotted hypotheses. The threshold curved surface generation unit 206 generates, on the threshold plane surface SS, the threshold curve SC made of a plurality of pruning thresholds PS in which a decrease in at least one of a plurality of pruning measures PM causes an increase in at least one thereof, using a portion of one line selected from a plurality of isopycnic lines EC as a part.

The hypothesis curved surface generation unit 207 generates the hypothesis curve HC made of a plurality of hypotheses of the subject data CD on the threshold plane surface SS, corresponding to each of the calculated pruning measures PM. The hypothesis pruning unit 208 prunes a plurality of hypotheses of the subject data CD, using the position at which the generated hypothesis curve HC intersects the threshold curve SC as the pruning threshold PS.

For this reason, when one hypothesis is searched for from the subject data CD in a search mode, a plurality of pruning measures PM of the pruning threshold PS appropriately change. Therefore, it is possible to provide the data processing device 200 of which at least one of the recognition speed and the recognition accuracy is higher than in the related art.

Meanwhile, the invention is not limited to the embodiment, but various types of modifications can be made without departing from the scope of the invention. For example, in the above-mentioned embodiment, an example is illustrated in which the threshold curve SC and the hypothesis curve HC are generated on the two-dimensional threshold plane surface SS specified by two pruning measures PM and hypothesis pruning is executed.

However, the threshold curved surface SC and the hypothesis curved surface HC may be generated on the three or more-dimensional threshold space SS specified by three or more pruning measures PM, and hypothesis pruning may be executed. When the threshold space SS is four or more-dimensional, the threshold curved surface SC and the hypothesis curved surface HC are expressed as a mathematical hyper-surface (not shown).

In addition, the above-mentioned is an illustration in which the test data TD and the subject data CD are input audio and the data processing device 200 executes audio recognition. However, the data processing device 200 according to the embodiment can also be used for the image recognition similarly.

Further, the embodiment is illustrated in which each of the units of the data processing device is logically realized as various types of functions by a computer program. However, each of such units can be formed as specific hardware, and can also be realized by a combination of software and hardware.

Meanwhile, the embodiment and a plurality of modified examples mentioned above can be naturally combined in the range consistent with the contents thereof. In addition, in the embodiment and modified examples mentioned above, although the structure and the like of each part have been specifically described, it is possible to variously change the structure and the like in the range that satisfies the invention.

The application claims priority from Japanese Patent Application No. 2010-000940 filed on Jan. 6, 2010, the content of which is incorporated herein by reference in its entirety.

The invention claimed is:

1. A data processing device comprising:
a data input unit configured to input test data in which a correct hypothesis is established in a learning mode for each of predetermined inputs, and inputs subject data for a hypothesis search in a search mode for each of the inputs;
a feature amount extraction unit, implemented by at least one hardware processor, which is configured to analyze the input test data and the input subject data and extracts each feature amount;
a hypothesis measure calculation unit configured to calculate a plurality of pruning measures for each of a plurality of hypotheses of the test data and the subject data using the extracted feature amount;
a data plotting unit configured to plot the plurality of hypotheses of the input test data on a threshold space specified by the plurality of pruning measures, corresponding to each of the calculated pruning measures;
an isopycnic surface setting unit configured to set a plurality of isopycnic surfaces on the threshold space, corresponding to densities of the plurality of plotted hypotheses;
a threshold curved surface generation unit configured to generate, on the threshold space, a threshold curved surface made of the plurality of pruning thresholds in which a decrease in at least one of the plurality of pruning measures causes an increase in at least one thereof, using a portion of one surface selected from the plurality of isopycnic surfaces as a part;
a hypothesis curved surface generation unit configured to generate a hypothesis curved surface made of the plurality of hypotheses of the subject data on the threshold space, corresponding to each of the calculated pruning measures; and
a hypothesis pruning unit that configured to prune the plurality of hypotheses of the subject data, using a position at which the generated hypothesis curved surface intersects the threshold curved surface as the pruning threshold.

2. The data processing device according to claim 1, wherein the threshold space is made of a two-dimensional threshold plane surface specified by a score difference of the hypotheses from a maximum likelihood hypothesis and a hypothesis rank which are the two pruning measures,
the hypothesis measure calculation unit is configured to calculate a score for each of the plurality of hypotheses of the test data and the subject data using the extracted feature amount and calculates the score difference and the hypothesis rank as the pruning measures,
the isopycnic surface setting unit is configured to set isopycnic lines which are the plurality of isopycnic surfaces on the threshold plane surface, corresponding to the densities of the plurality of plotted hypotheses,
the threshold curved surface generation unit is configured to generate a threshold curve as the threshold curved surface on the threshold plane surface, the threshold curve being made of the plurality of pruning thresholds in which a decrease in one of the score difference and the hypothesis rank causes an increase in the other thereof, using a portion of one line selected from the plurality of isopycnic lines as a part, and the hypothesis curved surface generation unit is configured to generate a hypothesis curve made of the plurality of hypotheses of the subject data as the hypothesis curved surface on the threshold plane surface, corresponding to the score difference and the hypothesis rank which are calculated.

3. The data processing device according to claim 2, further comprising a result output unit that is configured to output one hypothesis, having a maximum value of the scores accumulated from the plurality of hypotheses pruned in the search mode, as a search result.

4. The data processing device according to claim 1, wherein the test data and subject data are audio data, and wherein the data processing device is configured to perform audio recognition.

5. The data processing device according to claim 1, wherein the test data and subject data are image data, and wherein the data processing device is configured to perform image recognition.

6. An non-transitory information storage medium storing a computer program, the program causing a data processing device to execute:
- a data input process of inputting test data in which a correct hypothesis is established in a learning mode for each of predetermined inputs, and inputting subject data for a hypothesis search in a search mode for each of the predetermined inputs;
- a feature amount extraction process of analyzing the input test data and the subject data and extracting each feature amount;
- a hypothesis measure calculation process of calculating a plurality of pruning measures for each of a plurality of hypotheses of the test data and the subject data using the extracted feature amount;
- a data plotting process of plotting the plurality of hypotheses of the input test data on a threshold space specified by the plurality of pruning measures, corresponding to each of the calculated pruning measures;
- an isopycnic surface setting process of setting a plurality of isopycnic surfaces on the threshold space, corresponding to densities of the plurality of plotted hypotheses;
- a threshold curved surface generation process of generating, on the threshold space, a threshold curved surface made of the plurality of pruning thresholds in which a decrease in at least one of the plurality of pruning measures causes an increase in at least one thereof, using a portion of one surface selected from the plurality of isopycnic surfaces as a part;
- a hypothesis curved surface generation process of generating a hypothesis curved surface made of the plurality of hypotheses of the subject data on the threshold space, corresponding to each of the calculated pruning measures; and
- a hypothesis pruning process of pruning the plurality of hypotheses of the subject data, using a position at which the generated hypothesis curved surface intersects the threshold curved surface as the pruning threshold.

7. A data processing method, comprising:
- a data input operation of inputting test data in which a correct hypothesis is established in a learning mode for each of predetermined inputs, and inputting subject data for a hypothesis search in a search mode for each of the inputs;
- a feature amount extraction operation, implemented by at least one hardware processor, of analyzing the input test data and the subject data and extracting each feature amount;
- a hypothesis measure calculation operation of calculating a plurality of pruning measures for each of a plurality of hypotheses of the test data and the subject data using the extracted feature amount;
- a data plotting operation of plotting the plurality of hypotheses of the input test data on a threshold space specified by the plurality of pruning measures, corresponding to each of the calculated pruning measures;
- an isopycnic surface setting operation of setting a plurality of isopycnic surfaces on the threshold space, corresponding to densities of the plurality of plotted hypotheses;
- a threshold curved surface generation operation of generating, on the threshold space, a threshold curved surface made of the plurality of pruning thresholds in which a decrease in at least one of the plurality of pruning measures causes an increase in at least one thereof, using a portion of one surface selected from the plurality of isopycnic surfaces as a part;
- a hypothesis curved surface generation operation of generating a hypothesis curved surface made of the plurality of hypotheses of the subject data on the threshold space, corresponding to each of the calculated pruning measures; and
- a hypothesis pruning operation of pruning the plurality of hypotheses of the subject data, using a position at which the generated hypothesis curved surface intersects the threshold curved surface as the pruning threshold.

\* \* \* \* \*